United States Patent
Lei

(10) Patent No.: US 11,489,635 B2
(45) Date of Patent: Nov. 1, 2022

(54) METHOD AND APPARATUS FOR DETERMINING A DYNAMIC HARQ-ACK CODEBOOK

(71) Applicant: Lenovo (Beijing) Limited, Beijing (CN)

(72) Inventor: Haipeng Lei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 146 days.

(21) Appl. No.: 16/967,461

(22) PCT Filed: Feb. 7, 2018

(86) PCT No.: PCT/CN2018/075628
§ 371 (c)(1),
(2) Date: Aug. 5, 2020

(87) PCT Pub. No.: WO2019/153141
PCT Pub. Date: Aug. 15, 2019

(65) Prior Publication Data
US 2021/0226740 A1 Jul. 22, 2021

(51) Int. Cl.
*H04W 4/00* (2018.01)
*H04L 1/18* (2006.01)
*H04W 72/04* (2009.01)

(52) U.S. Cl.
CPC ....... *H04L 1/1861* (2013.01); *H04W 72/0446* (2013.01)

(58) Field of Classification Search
CPC ... H04L 1/1861; H04L 1/1864; H04L 1/0079; H04W 72/0446
USPC ........................................................ 370/329
See application file for complete search history.

(56) References Cited

U.S. PATENT DOCUMENTS

| | | |
|---|---|---|
| 2018/0019843 A1 | 1/2018 | Papasakellarion |
| 2019/0014560 A1* | 1/2019 | Takeda ............... H04L 1/1861 |
| 2019/0181986 A1* | 6/2019 | Kitamura ............ H04L 1/1819 |

FOREIGN PATENT DOCUMENTS

| | | |
|---|---|---|
| CN | 104396174 A | 3/2015 |
| CN | 107409014 A | 11/2017 |
| WO | 2017193390 A1 | 11/2017 |

OTHER PUBLICATIONS

PCT/CN2018/075628, "International Search Report and the Written Opinion of the International Search Authority" ISA/CN, State Intellectual Property Office of the P.R. China, dated Oct. 16, 2018, pp. 1-7.

* cited by examiner

*Primary Examiner* — Mang Hang Yeung
(74) *Attorney, Agent, or Firm* — Kunzler Bean & Adamson

(57) ABSTRACT

The present disclosure is related to a method and apparatus for determining a dynamic hybrid automatic repeat request-acknowledge (HARQ-ACK) codebook. A method for determining a dynamic HARQ-ACK codebook for includes receiving a plurality of downlink (DL) transmissions, wherein each DL transmission has an associated first signal indicating whether the DL transmission is a last transmission of the plurality of DL transmissions. The method further includes transmitting a HARQ-ACK codebook corresponding to the plurality of DL transmissions, wherein, based on the first signal, HARQ-ACK feedback for the last transmission of the plurality of DL transmissions is arranged at the end of the HARQ-ACK codebook. The present disclosure reduces signaling overhead for a dynamic HARQ-ACK codebook and avoids misunderstanding between a base unit and a remote unit when determining the dynamic HARQ-ACK codebook.

8 Claims, 10 Drawing Sheets

METHOD AND APPARATUS FOR DETERMINING A DYNAMIC HARQ-ACK CODEBOOK

TECHNICAL FIELD

The present disclosure generally relates to hybrid automatic repeat request-acknowledge (HARQ-ACK) feedback, and more specifically to a dynamic HARQ-ACK codebook.

BACKGROUND OF THE INVENTION

In wireless communication technology, in order to feedback whether data was correctly received in downlink (DL) or uplink (UL) transmission, HARQ-ACK feedback technology is commonly used during data transmission. HARQ-ACK represents collectively the Positive Acknowledgement (ACK) and the Negative Acknowledgement (NACK). ACK means data was correctly received, while NACK means data was erroneously received or missing. For HARQ-ACK feedback information (which may be called a HARQ-ACK codebook), the size of a HARQ-ACK codebook is usually preconfigured and/or determined during data transmission.

However, when there is no fixed or semi-static downlink association set in some cases, issues associated with determining dynamic HARQ-ACK feedback consists of HARQ-ACK bits corresponding to DL or UL transmissions for one or more slots in a dynamic downlink association set need to be solved, especially the issue associated with determining the size of a dynamic HARQ-ACK codebook, in order to avoid any misunderstanding between a base unit and a remote unit during data transmission.

In 3GPP LTE (Long Term Evolution) Release 10, a solution of carrier aggregation (CA) is introduced which enables two or multiple component carriers (CC) to be used together to provide high data transmission rates required for LTE Advanced. Moreover, when a dynamic HARQ-ACK codebook consists of HARQ-ACK bits corresponding to multiple DL or UL transmissions for one or more carriers in carrier domain and/or one or more slots in time domain for CA, issues associated with determining a dynamic HARQ-ACK codebook for CA, especially the issue associated with determining the size of a dynamic HARQ-ACK codebook for CA, also need to be solved.

Given the above, a manner of determining a dynamic HARQ-ACK codebook used for multiple DL or UL resources for one or more carriers in carrier domain and/or one or more slots in time domain is desirable.

BRIEF SUMMARY OF THE INVENTION

One objective of the present disclosure is to provide a manner of determining a dynamic HARQ-ACK codebook used for multiple DL or UL resources for one or more carriers in carrier domain and/or one or more slots in time domain.

One embodiment of the present disclosure provides an apparatus. The apparatus includes a receiver that receives a plurality of DL transmissions. Each DL transmission has a first signal indicating whether the DL transmission is a last transmission of the plurality of DL transmissions. The apparatus further includes a transmitter that transmits a HARQ-ACK codebook corresponding to the plurality of DL transmissions. Based on the first signal, HARQ-ACK feedback for the last transmission of the plurality of DL transmissions is arranged at the end of the HARQ-ACK codebook.

Another embodiment of the present disclosure provides an apparatus. The apparatus includes a transmitter that transmits a plurality of DL transmissions. Each DL transmission has a first signal indicating whether the DL transmission is a last transmission of the plurality of DL transmissions. The apparatus further includes a receiver that receives a HARQ-ACK codebook corresponding to the plurality of DL transmissions. Based on the first signal, HARQ-ACK feedback for the last transmission of the plurality of DL transmissions is arranged at the end of the HARQ-ACK codebook.

Yet another embodiment of the present disclosure also provides a method. The method includes receiving a plurality of DL transmissions. Each DL transmission has a first signal indicating whether the DL transmission is a last transmission of the plurality of DL transmissions. The method further includes transmitting a HARQ-ACK codebook corresponding to the plurality of DL transmissions. Based on the first signal, HARQ-ACK feedback for the last transmission of the plurality of DL transmissions is arranged at the end of the HARQ-ACK codebook.

A further embodiment of the present disclosure also provides a method. The method includes transmitting a plurality of DL transmissions. Each DL transmission has a first signal indicating whether the DL transmission is the last transmission of the plurality of DL transmissions. The method further includes receiving a HARQ-ACK codebook corresponding to the plurality of DL transmissions. Based on the first signal, HARQ-ACK feedback for the last transmission of the plurality of DL transmissions is arranged at the end of the HARQ-ACK codebook.

Embodiments according to the present disclosure can reduce signaling overhead for a dynamic HARQ-ACK codebook and avoid misunderstanding between a base unit and a remote unit when determining the dynamic HARQ-ACK codebook.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended figures. These figures depict only example embodiments of the present disclosure and are not therefore to be considered as limiting of its scope.

DETAILED DESCRIPTION OF THE INVENTION

The detailed description of the appended figures is intended as a description of the currently preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Embodiments of the present disclosure provide methods and apparatuses for a dynamic HARQ-ACK codebook determination. To facilitate understanding, embodiments of the present disclosure are provided under specific network architecture and new service scenarios, such as 3GPP 5G NR (new radio), 3GPP LTE (Long Term Evolution) Release 8 and onwards. Persons skilled in the art are well-aware that, with developments of network architecture and new service scenarios, the embodiments in the subject disclosure are also applicable to similar technical problems.

Figure 1:
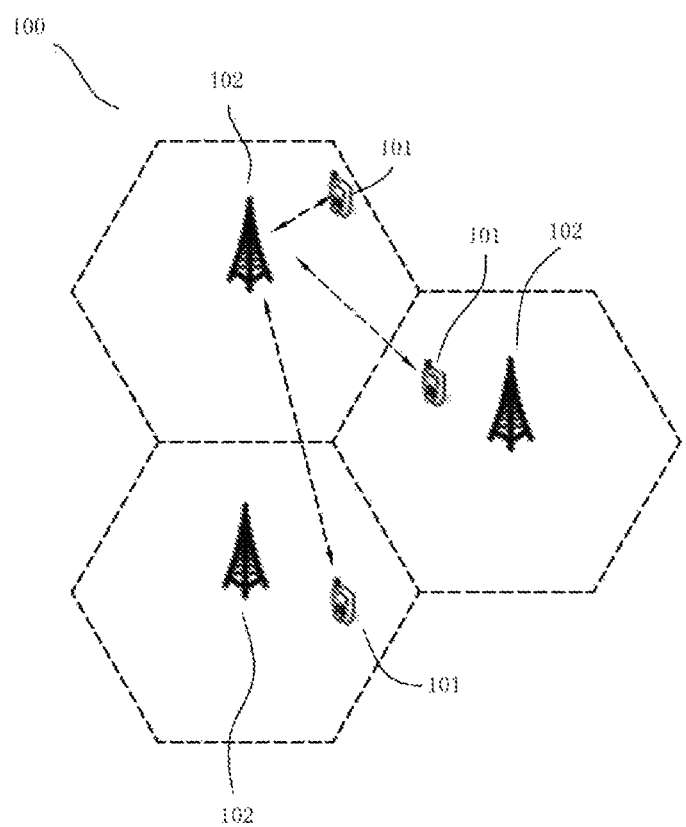
FIG. 1 illustrates an example block diagram of a wireless communication system according to an embodiment of the present disclosure.

FIG. 1 illustrates an example block diagram of a wireless communication system according to an embodiment of the present disclosure. As shown in FIG. 1, the wireless communication system 100 includes remote units 101 and base units 102. Even though a specific number of remote units 101 and base units 102 are depicted in FIG. 1, persons skilled in the art will recognize that the number of remote units 101 and the number of base units 102 in the wireless communication system 100 may vary.

The remote units 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the remote units 101 may include a portable wireless communication device, a smart phone, a cellular telephone, a flip phone, a device having a subscriber identity module, a personal computer, a selective call receiver, or any other device that is capable of sending and receiving communication signals on a wireless network. In an embodiment, the remote units 101 include wearable devices, such as smart watches, fitness bands, optical head-mounted displays, or the like.

Moreover, the remote units 101 may be referred to as subscriber units, mobiles, mobile stations, users, terminals, mobile terminals, wireless terminals, fixed terminals, subscriber stations, UE, user terminals, a device, or by other terminology used in the art. The remote units 101 may communicate directly with a base unit 102 via uplink or downlink communication signals.

The base units 102 may be distributed over a geographic region. In certain embodiments, a base unit 102 may also be referred to as an access point, an access terminal, a base, a base station, a macro cell, a Node-B, an enhanced Node B (eNB), a gNB, a Home Node-B, a relay node, a device, or by any other terminology used in the art. The base units 102 are generally part of a radio access network that may include one or more controllers communicably coupled to one or more corresponding base units 102.

The base units 102 are generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base units 102 may be communicably coupled to a mobility management entity (MME), a serving gateway (SGW), and/or a packet data network gateway (PGW).

The base units 102 may serve a number of remote units 101 within a serving area, for example, a cell or a cell sector via a wireless communication link. The base units 102 may communicate directly with one or more of the remote units 101 via communication signals. For example, a base unit 102 may serve remote units 101 within a macro cell.

The base units 102 transmits downlink (DL) communication signals to serve the remote units 101 in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the remote units 101 and the base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system 100 is compliant with the long-term evolution (LTE) of the 3GPP protocol, wherein the base unit 102 transmits using an orthogonal frequency division multiplexing (OFDM) modulation scheme on the DL and the remote units 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the base unit 102 may communicate using other communication protocols, such as the IEEE 802.11 family of wireless communication protocols. Further, in an embodiment, the base unit 102 may communicate over licensed spectrum, while in other embodiments the base unit 102 may communicate over unlicensed spectrum. The present disclosure is not intended to be limited to the implementation of any particular wireless communication system architecture or protocol. In another embodiment, the base unit 102 may communicate with remote units 101 using the 3GPP 5G protocols.

According to an embodiment of the present disclosure, DL transport blocks (TBs) are carried on the Physical Downlink Shared Channel (PDSCH). The HARQ-ACK feedback bits corresponding to the PDSCH are transmitted either on the Physical Uplink Control Channel (PUCCH) or on the Physical Uplink Shared Channel (PUSCH). A maximum of two TBs can be transmitted in one PDSCH in one serving cell and in one slot. One TB includes a plurality of code blocks, several code blocks in a TB are grouped into one code block group (CBG), and each code block within a code block group is independently decodable. That is, a TB includes a plurality of CBGs. The number of code blocks within one CBG, i.e., CBG size, varies according to the number of code blocks within one TB. The maximum number of CBGs per TB is configured by Radio Resource Control (RRC) signaling. Furthermore, in single codeword (CW) configuration, the maximum configurable number of CBGs per TB is 8, the possible max number of CBGs per TB is 2, 4, 6, or 8; and in multiple CW configurations, the maximum configurable number of CBGs per TB is 4, and the configured maximum number of CBGs per TB is the same between TBs.

Regarding the solution of CA used in 3GPP 5G NR (which may be called NR CA, for example), a 3GPP standard document named "NR Spec TS38.213" under 3GPP 5G NR specifies a semi-static HARQ-ACK codebook and a dynamic HARQ-ACK codebook for CA NR. More particularly, a 3GPP standard document named TS38.213 specifies a semi-static HARQ-ACK codebook size determination as "Type 1 HARQ-ACK codebook determination" and a dynamic HARQ-ACK codebook size determination as "Type 2 HARQ-ACK codebook determination." In 3GPP RAN1#91, agreements of generating two HARQ-ACK sub-codebooks are made, wherein the 1st sub-codebook includes TB-based HARQ-ACK (which may also be called TB-level HARQ-ACK) feedback, the 2nd sub-codebook includes CBG-based HARQ-ACK (which may also be called CBG-level HARQ-ACK) feedback, and these two sub-codebooks are combined into a single HARQ-ACK codebook (sub-codebook for TB-based HARQ-ACK is arranged first), to be transmitted between a base unit and a remote unit.

Counter downlink assignment index (DAI) and total DAI are specified in LTE Rel-13 eCA (enhanced Carrier Aggregation). A dynamic HARQ-ACK codebook in TS38.213 is not fully dynamic, because CBG-level HARQ-ACK for each TB is mapped to the RRC configured maximum number of CBGs per TB across all the carriers that are configured with CBG-based retransmission. To realize a fully dynamic HARQ-ACK codebook, an index(s), such as, CBG-level DAI(s), may be specified. In this way, the HARQ-ACK codebook can have the least signaling overhead and guarantee the same knowledge on HARQ-ACK codebook size between a base unit and a remote unit. However, in the case that the maximum number of CBGs per TB is set to the maximum value of 8, generally, CBG-level DAI(s) including both five bits counter DAI (C-DAI) and five bits total DAI (T-DAI) need to be specified, in order to detect the probability of two back-to-back slot missing.

In response to not fixed or semi-static downlink association set, a downlink association set has to be dynamically determined based on timing offset between PDSCH and the corresponding PUCCH. Thus, a remote unit and a base unit need to determine a dynamic HARQ-ACK codebook for a dynamic downlink association set. For multiple DL transmissions in one or more slots within a dynamic downlink association set, a remote unit and a base unit may have an ambiguity problem associated with the size of a dynamic HARQ-ACK codebook.

In particular, eight possible timing offset values are included in a downlink association set configured by RRC signaling, and three bits in DL assignment are used to explicitly indicate a HARQ-ACK timing offset value that is decided by a base unit. For example, DL transmissions in four slots, Slot n to Slot n+3, indicate the HARQ-ACK timing offsets are 4, 3, 2 and 1, respectively. As a result, these four slots, Slot n to Slot n+3, form a dynamic downlink association set. After receiving DL transmissions in these four slots, a remote unit should transmit the corresponding HARQ-ACK feedback in one uplink control information (UCI) in slot n+4. Accordingly, a size of a HARQ-ACK codebook for this dynamic downlink association set needs to be determined, before composing the HARQ-ACK codebook.

Under a certain scenario, in response to one or more DL transmissions, if the last one or more slots are missed, because a remote unit cannot detect the missed DL transmission(s), the remote unit cannot correctly determine the size of a HARQ-ACK codebook corresponding to all DL transmissions and cannot construct the HARQ-ACK codebook. For example, in a case that PDCCH transmitted in the last slot is missed, a remote unit cannot know that the last PDCCH has been missed, and thus the remote unit may erroneously determine the size of a HARQ-ACK codebook.

For another example, in a case that four DL transmissions in four slots are transmitted while one DL transmission in the last slot is missed during data transmission, a base unit knows that the actual HARQ-ACK codebook size should be 4, but the remote unit merely identifies three DL transmissions and erroneously determines the HARQ-ACK codebook size as 3, instead of 4, due to the last slot missing. Therefore, this misunderstanding regarding HARQ-ACK codebook size between the base unit and the remote unit needs to be avoided. Otherwise, the base unit cannot correctly interpret the HARQ-ACK feedback reported by the remote unit.

A similar issue also happens under the carrier aggregation (CA) scenario, in which multiple component carriers (CCs) are aggregated and HARQ-ACK feedback bits corresponding to the multiple carriers are transmitted in one HARQ-ACK codebook. In response to one or more DL transmissions on a carrier in the last one or more slots are missed, the size of a HARQ-ACK codebook also cannot be correctly determined, because a remote unit cannot detect the misses DL transmission(s).

In an embodiment of the present disclosure, slot-based DL scheduling and non-slot based DL scheduling are included in one downlink association set. Slot-based PDSCH transmission is also referred to PDSCH mapping type A in TS38.214, which can start from Symbol 0, 1, 2 or 3 and have a duration up to 14 symbols within a slot. Non-slot based PDSCH transmission is also referred to PDSCH mapping type B in TS38.214, which can start from any symbol of {0, 1, 2, . . . , 12} and have a duration of {2, 4, 7} symbols within a slot in Rel-15. Additionally, PDCCH monitoring occasions for slot-based scheduling are located in the beginning one, two, or three symbols of a slot. In other words, the starting location for possible slot-based PDCCH in time domain is the first, second or third symbols, like PDCCH in LTE. Potential PDCCH monitoring occasions for non-slot based scheduling are configured by RRC signaling.

In a case that one downlink association set includes slot-based scheduling and non-slot based scheduling, in response to the last DL assignment is missed, a remote unit and a base unit may have an ambiguity issue associated with the size of a dynamic HARQ-ACK codebook.

According to an embodiment of the present disclosure, for determining a dynamic HARQ-ACK codebook, a last DL Assignment indicator/indication (LDAI) is introduced into control information of data transmission(s). LDAI is used to indicate whether the DL transmission is a last transmission of the plurality of DL transmissions, so that a remote unit can identify that whether the last DL transmission is missed during data transmission, and thus the remote unit can synchronize the knowledge with regards to the size of a dynamic HARQ-ACK codebook with a base unit.

For an example, LDAI may be introduced into downlink control information (DCI) for scheduling a downlink transmission. For another example, LDAI may be introduced into DCI for indicating DL semi-persistent scheduling (SPS) release.

Alternatively, the LDAI may be named as a last DL Transmission indicator/indication (LTAI).

Figure 2:
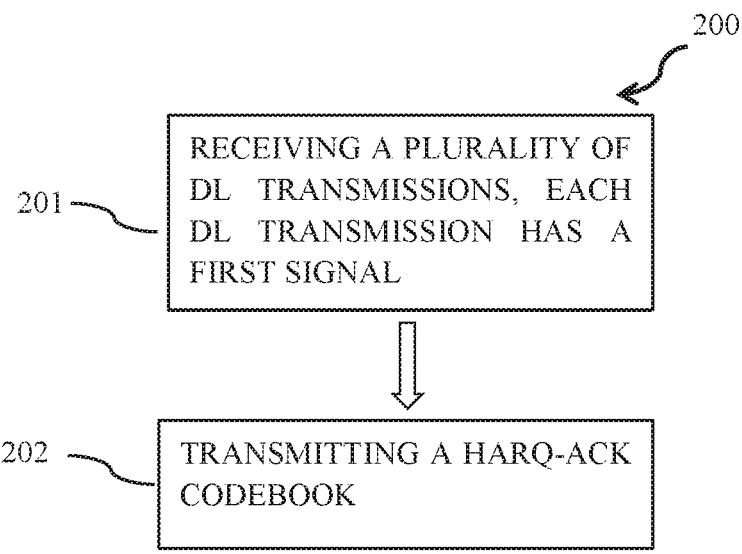
FIG. 2 illustrates an example flowchart demonstrating operations of a remote unit according to an embodiment of the present disclosure.

FIG. 2 illustrates an example flowchart demonstrating operations of a remote unit according to an embodiment of the present disclosure. In an embodiment of the present disclosure, the method 200 is performed by an apparatus, such as the remote units 101. In certain embodiments of the present disclosure, the method 200 may be performed by a processor executing program codes, for example, a microcontroller, a microprocessor, a CPU, a GPU, an auxiliary processing unit, a FPGA, or the like.

In step 201 of FIG. 2, a plurality of DL transmissions are received, wherein each DL transmission has a first signal indicating whether the DL transmission is the last transmission of the plurality of DL transmissions. In step 202 of FIG. 2, a HARQ-ACK codebook corresponding to the plurality of DL transmissions is transmitted, wherein, based on the first signal, HARQ-ACK feedback for the last transmission of the plurality of DL transmissions is arranged at the end of the HARQ-ACK codebook. All implementations or embodiments of HARQ-ACK codebook determination mentioned in the present disclosure are applicable for this embodiment.

Figure 3:
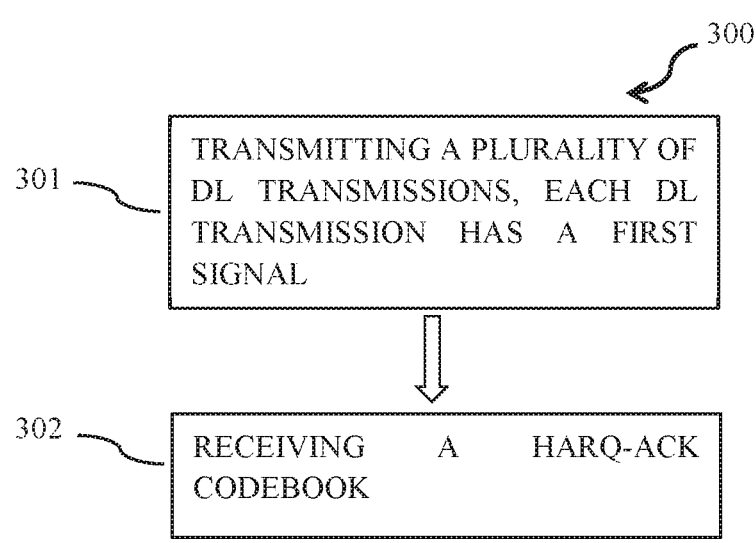
FIG. 3 illustrates an example flowchart demonstrating operations of a base unit according to an embodiment of the present disclosure.

FIG. 3 illustrates an example flowchart demonstrating operations of a base unit according to an embodiment of the present disclosure. In an embodiment of the present disclosure, the method 300 is performed by an apparatus, such as the base units 102. In certain embodiments, the method 300 may be performed by a processor executing program codes, for example, a microcontroller, a microprocessor, a CPU, a GPU, an auxiliary processing unit, a FPGA, or the like.

In step 301 of FIG. 3, a plurality of DL transmissions are transmitted, wherein each DL transmission has a first signal indicating whether the DL transmission is the last transmission of the plurality of DL transmissions. In step 302 of FIG. 3, a HARQ-ACK codebook corresponding to the plurality of DL transmissions is received. Based on the first signal, HARQ-ACK feedback for the last transmission of the plurality of DL transmissions is arranged at the end of the HARQ-ACK codebook. All implementations or embodiments of HARQ-ACK codebook determination mentioned in the present disclosure are applicable for this embodiment.

According to an embodiment of the present disclosure, the first signal transmitted/received in FIGS. 2 and 3 indicates whether the DL transmission is the last transmission of a plurality of DL transmissions in a plurality of slots. For another example, the first signal transmitted/received in FIGS. 2 and 3 indicates whether the DL transmission is the last transmission of a plurality of DL transmissions in each slot of a plurality of slots.

According to an embodiment of the present disclosure, based on the first signal, a remote unit determines whether the last DL transmission is received or not, and then, in response to last DL transmission being not received, the remote unit arranges one or more NACK bits for the last DL transmission at the end of the HARQ-ACK codebook. In combination with other HARQ-ACK feedback for other DL transmissions determined by the remote unit, a final HARQ-ACK codebook may be constructed.

According to an embodiment of the present disclosure, the first signal is LDAI, LDAI is introduced in each DL assignment in a downlink association set, and LDAI is used to indicate whether the current DL assignment is the last DL assignment of the current downlink association set. For a further example, a downlink association set includes both slot-based scheduling and non-slot based scheduling, and LDAI is introduced in each DL assignment for slot-based scheduling and non-slot based scheduling in the downlink association set, to indicate whether the current DL assignment is the last DL assignment of the current downlink association set.

In an embodiment of the present disclosure, one bit in DL assignment is used as LDAI. For example, when LDAI is set to "1" it represents the current DL assignment is the last DL assignment within the current downlink association set; whereas, if LDAI is set to "0" it represents the current DL assignment is not the last DL assignment in the current downlink association set.

Figure 4:
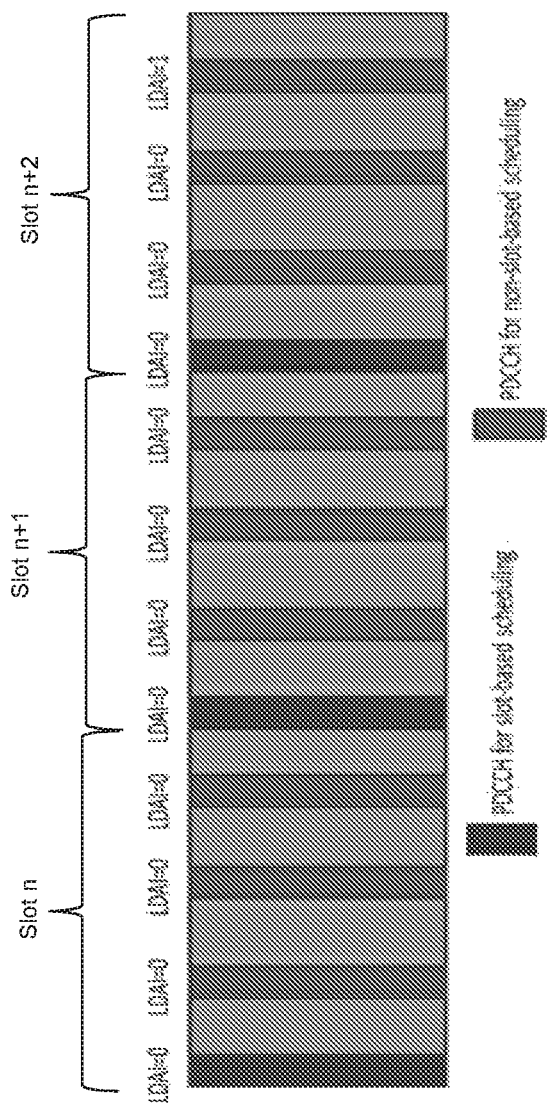
FIG. 4 illustrates an example of last DL Assignment indicator/indication (LDAI) within a downlink association set according to an embodiment of the present disclosure.

FIG. 4 illustrates an example of LDAI within a downlink association set according to an embodiment of the present disclosure. In this embodiment, FIG. 4 shows an example of a downlink association set, wherein there are three slots (Slot n, Slot n+1, and Slot n+2) in the downlink association set, and each slot includes one PDCCH for slot-based scheduling and three PDCCHs for non-slot-based scheduling.

According to the embodiment of FIG. 4, LDAI carried on each PDCCH indicates whether the PDCCH is the last DL transmission/assignment in the entire downlink association set. As shown in FIG. 4, each PDCCH in Slot n, Slot n+1, and Slot n+2 carries one LDAI, each slot within three slots of the downlink association set includes four LDAIs, and the entire downlink association set carries twelve LDAIs in total; wherein only LDAI carried on the last PDCCH for non-slot-based scheduling in Slot n+2 is set to "1," to indicate that this PDCCH is the last PDCCH in the entire downlink association set; while all other eleven LDAIs carried on PDCCHs in the downlink association set are indicated with "0," to indicate that these PDCCHs are not the last PDCCH in the entire downlink association set.

According to the embodiment of FIG. 4, each slot within the three slots of the downlink association set includes four PDCCHs. However, persons skilled in the art are well-aware that a downlink association set may include different numbers of slots, and a slot in the downlink association set may include different numbers of PDCCHs for slot-based scheduling or different numbers of PDCCHs for non-slot-based scheduling.

For example, in another embodiment, a downlink association set includes two slots, Slot n and Slot n+1, wherein Slot n includes one PDCCH for slot-based scheduling followed by two PDCCHs for non-slot-based scheduling, Slot n+1 includes one PDCCHs for slot-based scheduling followed by one PDCCHs for non-slot-based scheduling;

accordingly, each PDCCH in Slot n and Slot n+1 carriers one LDAI, and Slot n includes three LDAIs while Slot n+1 includes two LDAIs, and the entire downlink association set carries five LDAIs in total, wherein only LDAI carried on the last PDCCH for non-slot-based scheduling in the second slot is set to "1," to indicate that this PDCCH is the last PDCCH in the entire downlink association set; while all other four LDAIs carried on PDCCHs in the downlink association set are indicated with "0," to indicate that these PDCCHs are not the last PDCCH in the entire downlink association set According to another embodiment of the present disclosure, the first signal is LDAI, and LDAI is introduced in each DL assignment in a downlink association set, to indicate whether the current DL assignment is the last DL assignment of the current slot within one or more slots of the downlink association set. For a further example, a downlink association set includes slot-based scheduling and non-slot based scheduling, and LDAI is introduced in each DL assignment for slot-based scheduling and non-slot based scheduling in the downlink association set, to indicate whether the current DL assignment is the last DL assignment of the current slot within slot(s) of the downlink association set.

In an embodiment of the present disclosure, one bit in DL assignment is used as LDAI, wherein "1" represents the current DL assignment is the last DL assignment in the current slot within slot(s) in a downlink association set; whereas "0" represents the current DL assignment is not last DL assignment in the current slot within slot(s) in the downlink association set.

Figure 5:
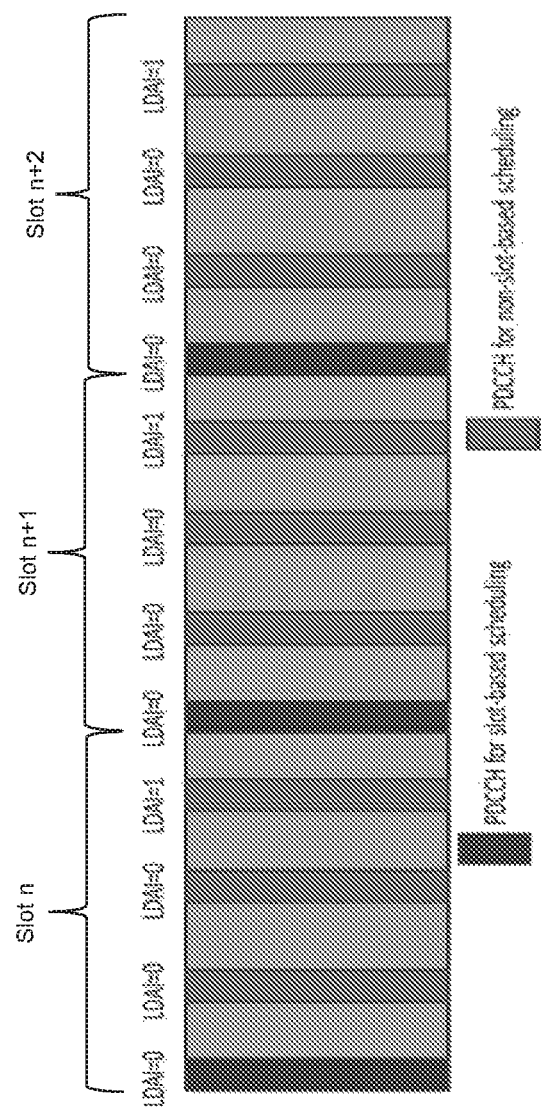
FIG. 5 illustrates an example of LDAI within a downlink association set according to another embodiment of the present disclosure.

FIG. 5 illustrates an example of LDAI within a downlink association set according to another embodiment of the present disclosure. In this embodiment, FIG. 5 shows an example of a downlink association set, wherein the downlink association set includes three slots, Slot n, Slot n+1, and Slot n+2; each slot includes one PDCCH for slot-based scheduling and three PDCCHs for non-slot-based scheduling; and each PDCCH in Slot n, Slot n+1, and Slot n+2 carries one LDAI for indicating whether the PDCCH is the last PDCCH in the current slot.

As shown in FIG. 5, the downlink association set carries twelve LDAIs in total, and each slot within three slots includes four LDAIs. In the first slot, Slot n, the PDCCH for slot-based scheduling carries one LDAI and three PDCCHs for non-slot-based scheduling carry three LDAIs, respectively; wherein only the LDAI carried on the third PDCCH for non-slot-based scheduling in Slot n is set to "1," to indicate that this PDCCH is the last PDCCH in Slot n in the downlink association set; while other three LDAIs (which are carried on the PDCCH for slot-based scheduling and the first and second PDCCHs for non-slot-based scheduling in Slot n, respectively) are set to "0," to indicate that these PDCCHs are not the last PDCCH in Slot n. Likewise, in the second or third slot, Slot n+1 or Slot n+2, as shown in FIG. 5, only LDAI carried on the third PDCCH for non-slot-based scheduling in Slot n+1 or Slot n+2 is set to "1," and all other LDAIs are set to "0." Please note that the number of PDCCHs for slot-based scheduling and that of the PDCCHs for non-slot-based scheduling are not limited by the embodiment of FIG. 5 as well and persons skilled in the art are well-aware that a downlink association set may include different numbers of slots, and a slot in the downlink association set may include different numbers of PDCCHs for slot-based scheduling or different numbers of PDCCHs for non-slot-based scheduling.

According to an embodiment of the present disclosure, after receiving the LDAI bit carried in each DL assignment, a remote unit can identify whether the current DL assignment is the last DL assignment of the plurality of DL assignments in one or more slots in a downlink association set. For instance, with the help of LDAI, in case that the last DL assignment in slot(s) in the downlink association set is missed, a remote unit can identify that the last DL assignment has been missed, and then the remote unit can generate NACK for the missed last DL assignment as HARQ-ACK feedback. In other words, for a dynamic downlink association set, using LDAI guarantees that a base unit and a remote unit have the same knowledge of the size a dynamic HARQ-ACK codebook.

According to another embodiment of the present disclosure, LDAI is used to indicate whether the DL transmission is transmitted in a last slot of the plurality of slots. In this case, the LDAI may also be named as Last Slot indicator/indication (LSI). For instance, LSI may be introduced in DL assignment to indicate whether the current slot is the last scheduled slot of the current downlink association set.

In an embodiment of the present disclosure, one bit in DL assignment is used as LSI. For example, "1" represents the current slot is the last scheduled slot within the current downlink association set; whereas "0" represents the current slot is not the last scheduled slot within the current downlink association set.

In an embodiment of the present disclosure, one LSI bit is carried on each PDCCH in one or more slots of a downlink association set. After receiving the LSI bit on a PDCCH in a slot, a remote unit can identify whether the current slot is the last scheduled slot within the entire downlink association set. In this embodiment, with the help of LSI, in case that the PDCCH in the last slot is missed, a remote unit can identify that the PDCCH in the last slot has been missed, and then the remote unit can generate NACK for the last missed slot as HARQ-ACK feedback. Accordingly, for a dynamic downlink association set, using LSI guarantees that a base unit and a remote unit have the same knowledge of the size a dynamic HARQ-ACK codebook.

Figure 6:
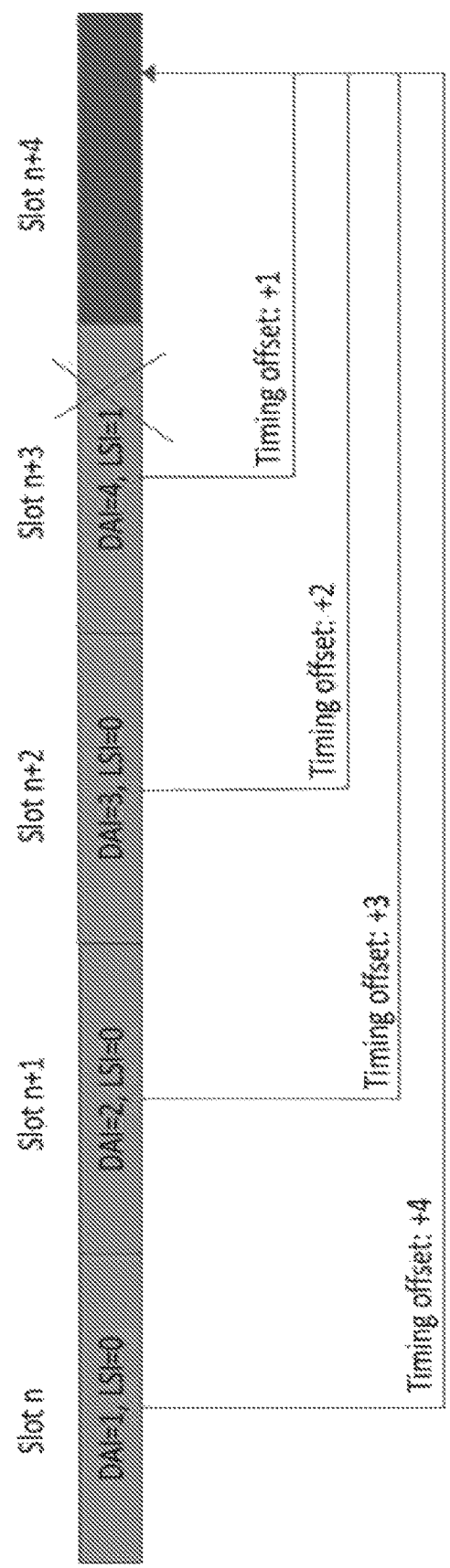
FIG. 6 illustrates an example of Last Slot indicator/indication (LSI) within a downlink association set according to an embodiment of the present disclosure.

FIG. 6 illustrates an example of LSI within a downlink association set according to an embodiment of the present disclosure. In this embodiment, one single carrier is scheduled, and four slots, Slot n to Slot n+3, form a dynamic downlink association set. As shown in FIG. 6, each of the four slots indicates the HARQ-ACK timing offsets of 4, 3, 2 and 1, respectively, and each slot carries both the DAI and LSI; wherein the LSI of Slot n+3 is set to "1," to indicate that Slot n+3 is the last scheduled slot within the downlink association set, while other three LSIs of Slot n, Slot n+1, and Slot n+2 are set to "0," to indicate that these three slots are not the last scheduled slot within the downlink association set.

According to the embodiment of FIG. 6, after receiving DL transmissions/assignments in four slots in the downlink association set, a remote unit may determine whether all DL transmissions/assignments in these slots are received, and then the remote unit may correctly determine the size of a dynamic HARQ-ACK codebook. As shown in FIG. 6, in response to Slot n+3 being missed, a remote unit merely receives three LSIs of Slot n to Slot n+2 set to "0," but does not receive LSI set to "1," and then, the remote unit identifies that the last slot in the downlink association set is not received. With the help of DAI and LSI, the remote unit can determines that a dynamic HARQ-ACK codebook includes 3 HARQ-ACK bits, which correspond to Slot n to Slot n+2 in the downlink association set, and 1 NACK bit which corresponds to Slot n+3 in the downlink association set. After that, the remote unit may transmit the HARQ- ACK codebook in one UCI in Slot n+4. The UCI may be transmitted on PUCCH with indicated PUCCH resource, or the UCI may be transmitted on PUSCH if the PUSCH is scheduled in the same slot. In other words, introducing LSI guarantees that a base unit and a remote unit have the same knowledge of the size a dynamic HARQ-ACK codebook.

As mentioned above, the traditional "Type 2 HARQ-ACK codebook determination" utilizes five bits C-DAI and five bits T-DAI in case the maximum number of CBGs per TB is set to the maximum value of 8. In the above-mentioned embodiment, one-bit LSI is included in DCI for each slot of a carrier, in order to indicate whether the current slot is the last scheduled slot of the current downlink association set. After receiving LCI for each scheduled slot of a carrier, a remote unit may correctly determine the size of a dynamic HARQ-ACK codebook. However, under the carrier aggregation (CA) scenario, in response to a downlink association set includes multiple CCs, once a scheduled CC carrying LSI is missing, the number of CCs received by a remote unit is less than a total number of actually scheduled CCs; accordingly, a remote unit can only receive a part of all LSI(s) carried in the downlink association set, and LSI(s) identified by the remote unit cannot reflect all the actually scheduled CCs. As such, the size of a dynamic HARQ-ACK codebook determined by the remote unit according to the LSI(s) may be incorrect. This causes ambiguity on HARQ-ACK codebook size between a base unit and a remote unit.

Based on this, a preferred embodiment of the present disclosure applies both LSI and T-DAI in DCI, so as to correctly determine the size of a dynamic HARQ-ACK codebook even if some CC(s) including DCI is missed. In an example, one-bit LSI and one-bit T-DAI are included in DCI for each slot of a CC. In a further example, one-bit LSI and two-bit T-DAI are included in DCI for each slot of a CC.

A further preferred embodiment of the present disclosure applies all LSI, C-DAI, and T-DAI in DCI, so as to correctly determine the size of a dynamic HARQ-ACK codebook even if some CC(s) including DCI is missed. In an example, one-bit LSI, one-bit T-DAI and one-bit C-DAI are used in DCI for each slot of a CC. In a further example, one-bit LSI, two-bit T-DAI and two-bit C-DAI are used in the DCI for each slot of a CC. According to one embodiment of the present disclosure, unified C-DAI is used for separate sub-codebooks. According to another embodiment of the present disclosure, separate C-DAI is used for separate sub-codebooks, wherein the value of each C-DAI in each DL transmission is an accumulative number of carriers for DL transmissions for each carrier groups.

In an embodiment of the present disclosure, in response to a carrier group includes one or more CCs, a downlink transmission on each CC within the carrier group is mapped to the same number of HARQ-ACK bits in a HARQ-ACK codebook. For example, in response to a carrier group includes three CCs and each CC within this carrier group is configured with TB-based retransmission, a downlink transmission on each CC is mapped to one HARQ-ACK bit in a HARQ-ACK codebook, and downlink transmissions on all these three CCs are mapped to three HARQ-ACK bits in the HARQ-ACK codebook. In other words, the HARQ-ACK codebook includes three HARQ-ACK bits corresponding to downlink transmissions on three TBs of three CCs within this carrier group.

For another example, in response to a carrier group includes two CCs and each CC within this carrier group is configured with CBG-based retransmission, in case the maximum number of CBGs per TB is set to 8, a downlink transmission on each CC is mapped to 8 HARQ-ACK bits in a HARQ-ACK codebook, and downlink transmissions on these two CCs are mapped to 16 HARQ-ACK bits (2*8=16) in the HARQ-ACK codebook. In other words, the HARQ-ACK codebook includes 16 HARQ-ACK bits corresponding to downlink transmissions on 16 CBGs of two CCs within the carrier group.

Figure 7:
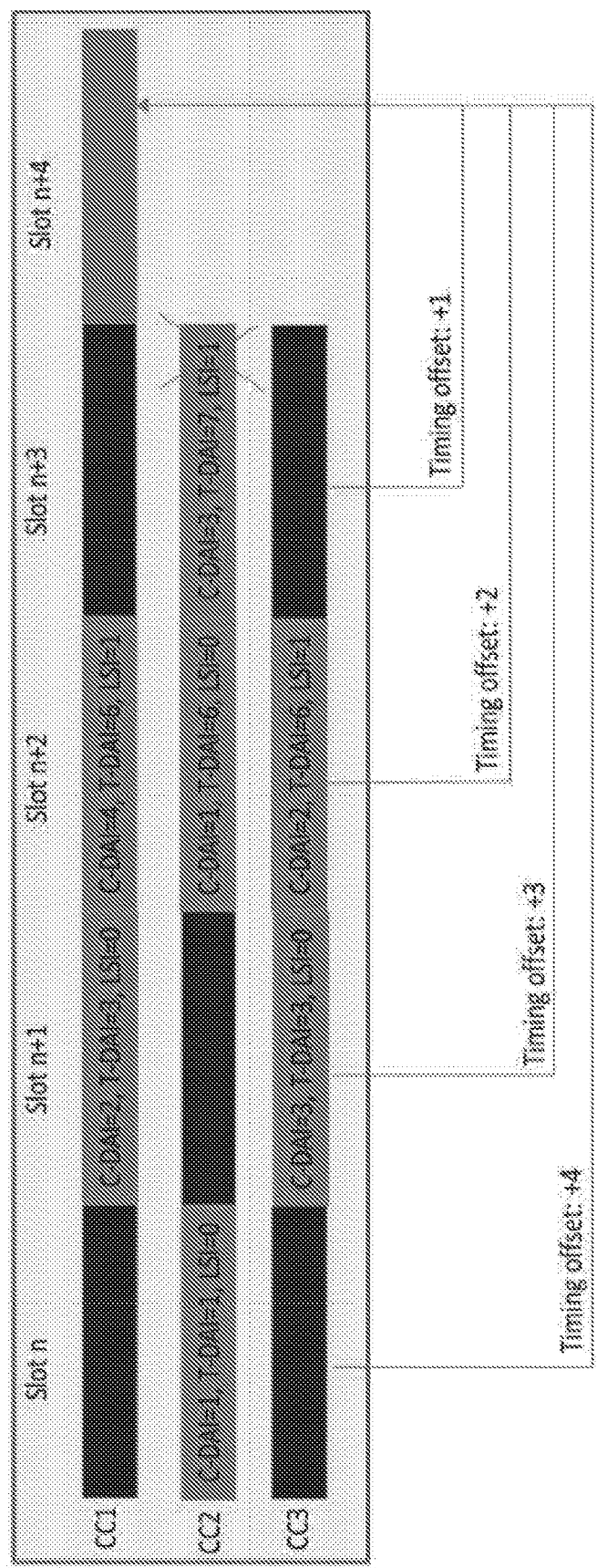
FIG. 7 illustrates an example of LSI within a downlink association set according to another embodiment of the present disclosure.

FIG. 7 illustrates an example of LSI within a downlink association set according to another embodiment of the present disclosure. In this embodiment, multiple slots for multiple carriers are scheduled to form a dynamic downlink association set. The carriers in the downlink association set may be based on TB-based retransmission or CBG-based retransmission. According to this embodiment, LSI indicates whether the current slot is the last scheduled slot on current carrier within current downlink association set. In other words, LSI indicates the last scheduled slot per carrier.

In this embodiment, one bit in DL assignment may be used as LSI. For example, "1" represents the current slot is the last scheduled slot on current carrier within the current downlink association set; while "0" represents the current slot is not the last scheduled slot on current carrier within the current downlink association set.

As shown in FIG. 7, a dynamic downlink association set includes four slots (Slot n to Slot n+3) for three CCs (CC1, CC2, and CC3); each of the four slots indicates the HARQ-ACK timing offsets are 4, 3, 2 and 1, respectively, and each DL transmission/assignment carries C-DAI, T-DAI, and LSI. In particular, for CC1, Slot n+1 and Slot n+2 are scheduled, and thus, LSI for Slot n+1 is indicated with "0" to indicate that this slot is not the last scheduled slot for CC1 within the downlink association set, while LSI for Slot n+2 is indicated with "1" to indicate that this slot is the last scheduled slot for CC1 within the downlink association set. Similarly, for CC2, LSI for Slot n and LSI for Slot n+2 are indicated with "0," while LSI for Slot n+3 is indicated with "1"; and for CC3, LSI for Slot n+1 is indicated with "0," while LSI for Slot n+2 is indicated with "1."

As depicted in FIG. 7, after receiving all LSIs set to "0" or "1" for slots on CC1 and CC3, a remote unit identifies that all DL assignments on CC1 and CC3 are received; however, in response to Slot n+3 on CC2 is missed, the remote unit merely receives two LSIs for Slot n and Slot n+2 on CC2 which are set to "0," without receiving LSI set to "1"; then, the remote unit identifies that the last slot on CC2 in the downlink association set is not received. With the help of C-DAI, T-DAI, and LSI, the remote unit can determine that one DL assignment in Slot n+3 on CC2 is missed.

After that, the remote unit may correctly determine the size of a dynamic HARQ-ACK codebook, generate NACK for the missed slot, and transmit the dynamic HARQ-ACK codebook in Slot n+4. In response to each CC in the downlink association set is configured with TB-based retransmission, for the final HARQ-ACK codebook, the remote unit generates one NACK bit corresponding to the missed DL assignment in Slot n+3 on CC2. Alternatively, in response to each CC in the downlink association set is configured with CBG-based retransmission, the remote unit generates m NACK bits (wherein m represents the RRC configured maximum number of CBGs per TB) corresponding to the missed DL assignment in Slot n+3 on CC2; and in case the maximum number of CBGs per TB is set to 8, the remote unit generates 8 NACK bits corresponding to the missed DL assignment in Slot n+3 on CC2 for the final HARQ-ACK codebook.

Figure 8:
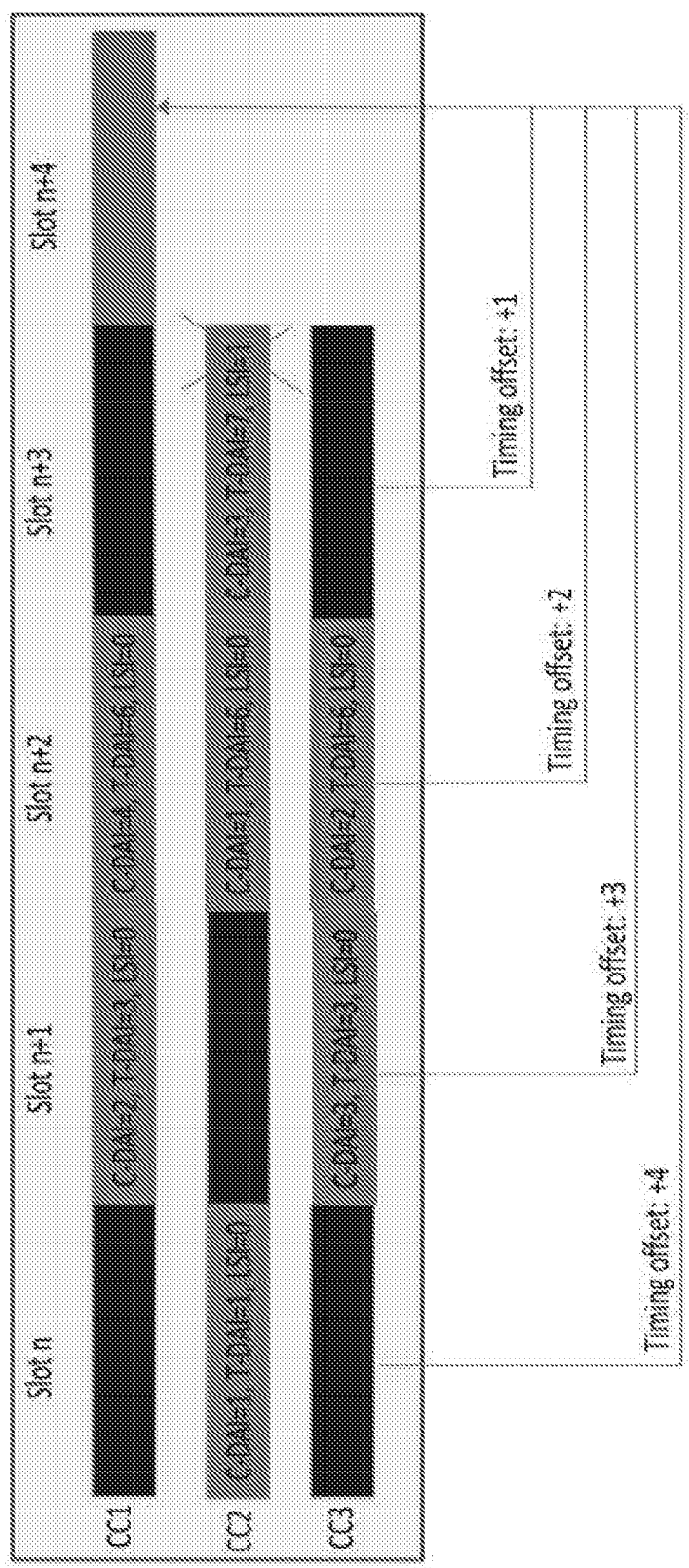
FIG. 8 illustrates an example of LSI within a downlink association set according to a further embodiment of the present disclosure.

FIG. 8 illustrates an example of LSI within a downlink association set according to a further embodiment of the present disclosure. According to this embodiment of FIG. 8, LSI indicates whether the current slot is the last scheduled slot across the multiple carriers within the current downlink association set. In other words, LSI indicates the last scheduled slot of the multiple carriers within a downlink association set. According to this embodiment, one bit in DL assignment may be used as LSI. For example, "1" represents the current slot is the last scheduled slot of the multiple carriers within the entire downlink association set; while "0" represents the current slot is not the last scheduled slot of the multiple carriers within the entire downlink association set.

As shown in FIG. 8, only LSI for Slot n+3 on CC2 is set to "1" to indicate that this slot is the last scheduled slot of the multiple CCs within the current downlink association set, while all other LSIs for other slots on each component carrier are set to "0." In response to Slot n+3 for CC2 is missed, the remote unit merely receives six LSIs for Slot n to Slot n+2 of all CCs which are set to "0," without receiving LSI set to "1"; then, the remote unit identifies that the last slot in the downlink association set is not received. With the help of C-DAI, T-DAI, and LSI, the remote unit can determine that one DL assignment in Slot n+3 is missed.

After that, a remote unit may correctly determine the size of a dynamic HARQ-ACK codebook, generate NACK for the missed slot, and transmit the dynamic HARQ-ACK codebook in Slot n+4. Similar to the embodiment of FIG. 7, the remote unit may generate one NACK bit or m NACK bits corresponding to the missed DL assignment in Slot n+3, in response to each CC in the downlink association set is configured with TB-based retransmission or CBG-based retransmission.

Although the embodiment shown in FIG. 8 has the same configurations of slots on CCs as those in FIG. 7, persons skilled in the art are well-aware that other configurations may also be applied to any embodiment in the present disclosure. For example, assuming Slot n+3 on CC1 and Slot n+3 on CC2 are scheduled, according to the embodiment of FIG. 8, both of LSI for Slot n+3 on CC1 and LSI for Slot n+3 on CC2 are set to "1," to indicate that Slot n+3 is the last scheduled slot on CC1 and CC2 within the current downlink association set.

According to an embodiment of the present disclosure, a dynamic HARQ-ACK codebook is divided into two sub-codebooks. Wherein the 1st sub-codebook is for TB-based HARQ-ACK for one or more component carriers (CCs) configured with TB-based retransmission. The 2nd sub-codebook is for CBG-based HARQ-ACK for one or more CCs configured with CBG-based retransmission. In one embodiment, after generating two sub-codebooks, the 2nd sub-codebook is appended to the end of the 1st sub-codebook, so that a final HARQ-ACK codebook is transmitted from a remote unit to a base unit.

According to an embodiment of the present disclosure, configured carriers are grouped into two carrier groups. For example, a first carrier group consists of CCs configured with TB-based retransmission, and HARQ-ACK feedback corresponding to the first carrier group is mapped to the 1st HARQ-ACK sub-codebook; a second carrier group consists of CCs configured with CBG-based retransmission, and HARQ-ACK feedback corresponding to the second carrier group is mapped to the 2nd HARQ-ACK sub-codebook. In one embodiment, the 1st sub-codebook is appended to the end of the 2nd sub-codebook, to form a final HARQ-ACK codebook for transmission in a single slot. In another embodiment, the 2nd sub-codebook is appended to the end of the 1st sub-codebook, to construct a final HARQ-ACK codebook for transmission in a single slot.

According to a further embodiment of the present disclosure, in response to one or more CCs in a specific carrier group are scheduled in a plurality of slots, a plurality of HARQ-ACK sub-codebooks for a plurality of slots for the specific carrier group are concatenated to form a final HARQ-ACK codebook for transmission in one channel from a remote unit to a base unit.

In another embodiment of the present disclosure, in response to multiple CCs are scheduled in multiple slots and these CCs are grouped into two carrier groups, a plurality of HARQ-ACK sub-codebooks corresponding to CC(s) for a plurality of slots for a first carrier group are concatenated to form a 1st HARQ-ACK sub-codebook, a plurality of HARQ-ACK sub-codebooks corresponding to CC(s) for a plurality of slots for a second carrier group are concatenated to form a 2nd HARQ-ACK sub-codebook, and then the 1st HARQ-ACK sub-codebook and the 2nd HARQ-ACK sub-codebook are concatenated to form a final HARQ-ACK codebook for transmission in one channel from a remote unit to a base unit.

According to an embodiment of the present disclosure, separate T-DAI may be used for separate sub-codebook. For example, T-DAI indicating a total number of CC(s) in a first carrier group is transmitted on each of one or more CCs in the first carrier group and used for generating 1st sub-codebook, and T-DAI indicating a total number of CC(s) in a second carrier group is transmitted on each of one or more CCs in the second carrier group and used for generating 2nd sub-codebook.

Alternatively, in a preferred embodiment, unified T-DAI may be used for separate sub-codebooks, wherein the value of T-DAI in DL assignment is a total number of CCs scheduled for all carrier groups. For instance, the value of T-DAI in DL assignment denotes a total number of PD-CCH(s) within a downlink association set. For a further example, the value of T-DAI is updated from one slot to next slot within the downlink association set. For the PDCCHs transmitted in the same slot within the same downlink association set, the value of T-DAI in DL transmissions is exactly same. The value of T-DAI is modular with $2^n$, wherein n is the number of bits for indicating the T-DAI.

Figure 9:
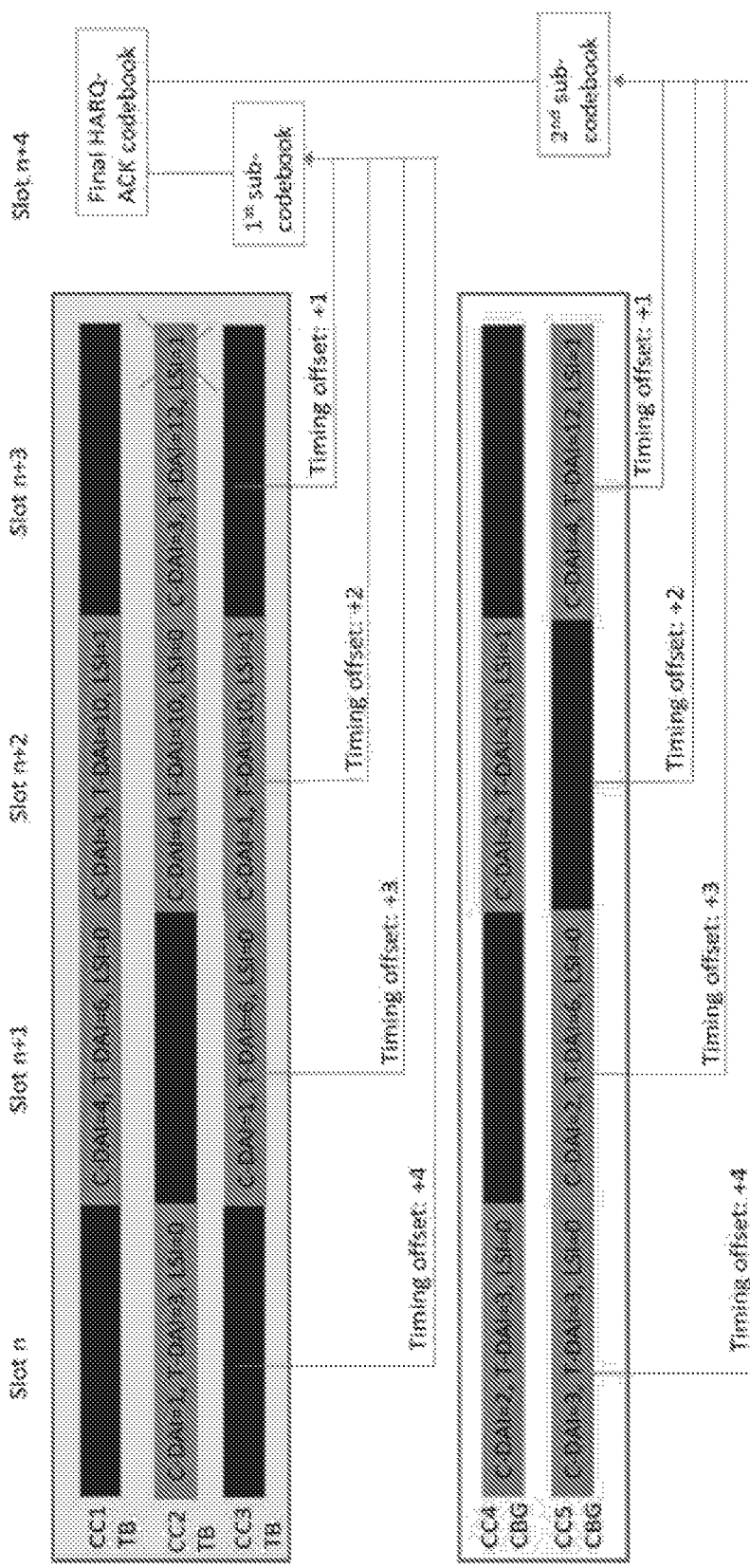
FIG. 9 illustrates an example of LSI within a downlink association set according to a further embodiment of the present disclosure.

FIG. 9 illustrates an example of LSI within a downlink association set according to a further embodiment of the present disclosure. As shown in FIG. 9, five CCs are configured to a remote unit indexed from CC1 to CC5, wherein CC1, CC2 and CC3 are configured with TB-level retransmission and included in a first carrier group, while CC4 and CC5 are configured with CBG-level retransmission and included in a second carrier group. Other configurations of CCs with TB-level or CBG-level retransmissions may be applied in the embodiment of FIG. 9.

As shown in FIG. 9, each of the four slots indicates the HARQ-ACK timing offsets are 4, 3, 2 and 1, respectively, and each DL transmission/assignment carries C-DAI, T-DAI, and LSI. According to this embodiment, similar to FIG. 7, LSI indicates whether the current slot is the last scheduled slot on the current carrier within the current downlink association set. In other words, LSI indicates the last scheduled slot per carrier.

In this embodiment of FIG. 9, one bit in DL assignment can be used as LSI. For example, "1" represents the current slot is the last scheduled slot on the current carrier within the current downlink association set; while "0" represents the current slot is not the last scheduled slot on the current carrier within the current downlink association set.

In particular, as depicted in FIG. 9, for CC1, the last slot is Slot n+2, and thus LSI for Slot n+1 on CC1 is indicated with "0," while LSI for Slot n+2 on CC1 is indicated with "1." Similarly, LSI for Slot n+3 on CC2, LSI for Slot n+2 on CC3, LSI for Slot n+2 on CC4, and LSI for Slot n+3 on CC5 are indicated with "1," while other LSIs for the scheduled slots on each CC are indicated with "0."

According to the embodiment of FIG. 9, firstly, the 1st sub-codebook is generated for the TB-based CCs (CC1, CC2 and CC3), and then the 2nd sub-codebook is generated for the CBG-based CCs (CC4 and CC5). In response to Slot n+3 for CC2 is missed, the remote unit merely receives two LSIs for Slot n and Slot n+2 of CC2 which are indicated with "0," without receiving LSI indicated with "1"; then, the remote unit identifies that the last slot on CC2 in the downlink association set is not received. With the help of C-DAI, T-DAI, and LSI, the remote unit can determine that the last slot on CC2 is Slot n+3. After that, the remote unit may correctly determine sizes of the 1st sub-codebook and the 2nd sub-codebook, generate NACK for the missed slot, and form a final dynamic HARQ-ACK codebook. All the implementations or embodiment in HARQ-ACK codebook determination mentioned in descriptions of the present application are applicable for this embodiment.

Figure 10:
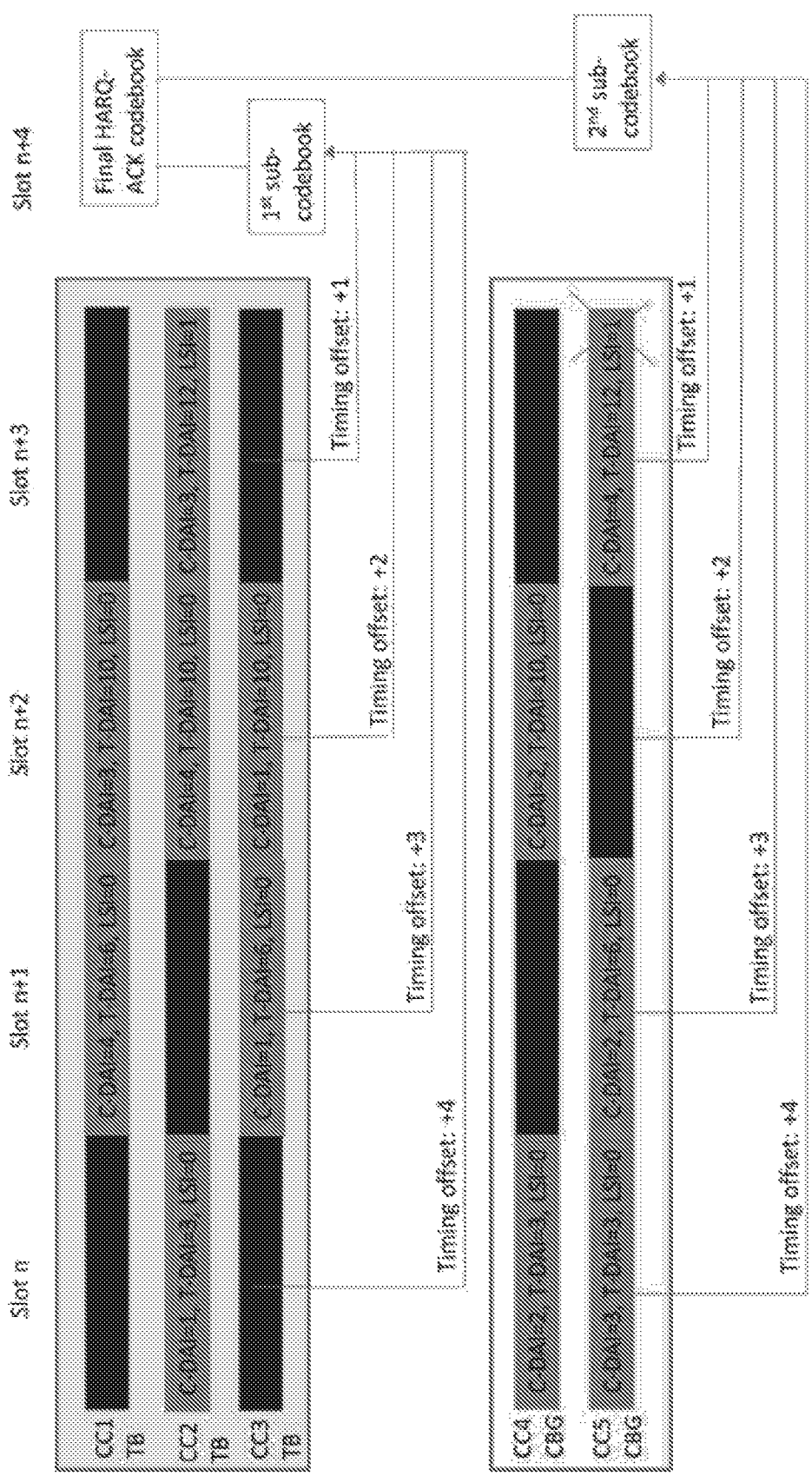
FIG. 10 illustrates an example of LSI within a downlink association set according to a further embodiment of the present disclosure.

FIG. 10 illustrates an example of LSI within a downlink association set according to a further embodiment of the present disclosure. According to this embodiment of FIG. 10, LSI indicates whether the current slot is the last scheduled slot within current carrier group within current downlink association set. In other words, LSI indicates the last scheduled slot of the current carrier group.

In this embodiment of FIG. 10, one bit in DL assignment can be used as LSI. For example, "1" represents the current slot is the last scheduled slot of the current carrier group within the current downlink association set; while "0" represents the current slot is not the last scheduled slot of the current carrier group within the current downlink association set.

As shown in FIG. 10, LSI for Slot n+3 on CC2 is indicated with "1" to indicate that this slot is the last scheduled slot of the first carrier group within the current downlink association set, and LSI for Slot n+3 on CC5 is indicated with "1" to indicate that this slot is the last scheduled slot of the second carrier group within the current downlink association set; while all other LSIs for other slots on each component carrier are indicated with "0."

According to the embodiment of FIG. 10, in response to Slot n+3 for CC5 is missed, with the help of LSI, the remote determines that the last slot of the second carrier group within the current downlink association set is missed; and the help of C-DAI, T-DAI, and LSI, the remote unit can determine that one DL assignment in Slot n+3 in the second carrier group is missed. After that, a remote unit may correctly determine the size of a dynamic HARQ-ACK codebook, generate NACK for the missed slot, and transmit the dynamic HARQ-ACK codebook in Slot n+4.

Similar to the embodiment of FIG. 7, the remote unit may generate one NACK bit or m NACK bits corresponding to the missed DL assignment in Slot n+3 in the second carrier group, in response to each CC in the second carrier group of the downlink association set is configured with TB-based retransmission or CBG-based retransmission. As shown in FIG. 10, CC1, CC2 and CC3 in a first carrier group are configured with TB-level retransmission, while CC4 and CC5 in a second carrier group are configured with CBG-level retransmission. Given this, after determining that one DL assignment in Slot n+3 in the second carrier group is missed, a remote unit should generate m NACK bits corresponding to the missed DL assignment in Slot n+3 in the second carrier group for the final dynamic HARQ-ACK codebook.

Figure 11:
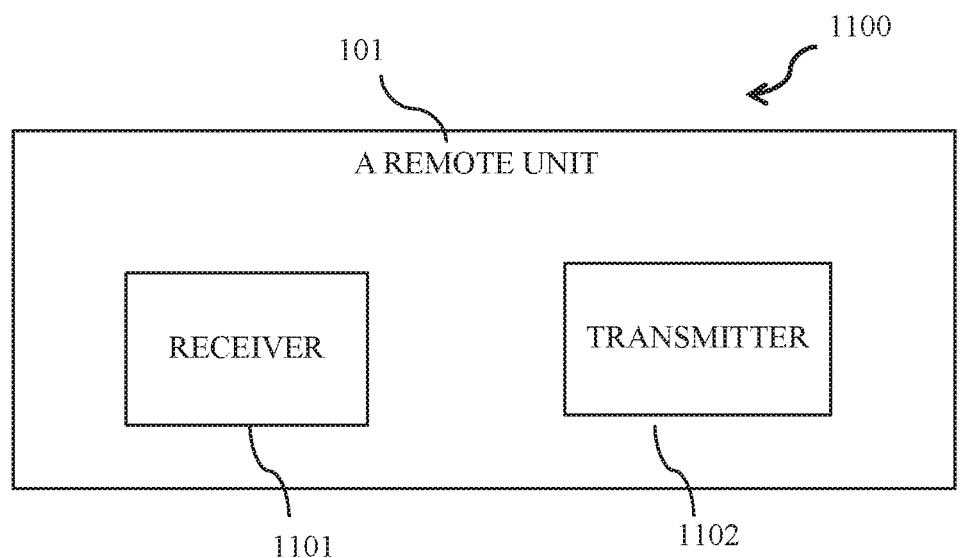
FIG. 11 illustrates an example block diagram of a remote unit according to an embodiment of the present disclosure.

FIG. 11 illustrates an example block diagram of a remote unit according to an embodiment of the present disclosure. The apparatus 1100 in FIG. 11 includes one embodiment of the remote unit 101. Furthermore, the remote unit 101 may include a receiver 1101 and a transmitter 1102. In an embodiment, the receiver 1101 and the transmitter 1102 may be integrated into a single device, such as a transceiver. In certain embodiments, the remote unit 101 may further include an input device, a display, a memory, and/or other elements.

In one embodiment, the receiver 1101 receives a plurality of DL transmissions, wherein each DL transmission has a first signal indicating whether the DL transmission is a last transmission of the plurality of DL transmissions. The transmitter 1102 transmits a HARQ-ACK codebook corresponding to the plurality of DL transmissions, wherein, based on the first signal, HARQ-ACK feedback for the last transmission of the plurality of DL transmissions is arranged at the end of the HARQ-ACK codebook.

The apparatus 1100 may further include a processor, which is used for determining a size of a HARQ-ACK codebook, constructing the HARQ-ACK codebook, or other processes performed in the apparatus 1100. For example, the processor determines whether the last DL transmission is received or not based on the first signal, and then, in response to last DL transmission being not received, the processor arranges one or more NACK bits for the last DL transmission at the end of the HARQ-ACK codebook. The functions and implementations of all elements in the apparatus 1100 and definitions of related technical terms can refer to the specific descriptions of FIGS. 2 and 4-10 and the foregoing corresponding paragraphs in this specification.

Figure 12:
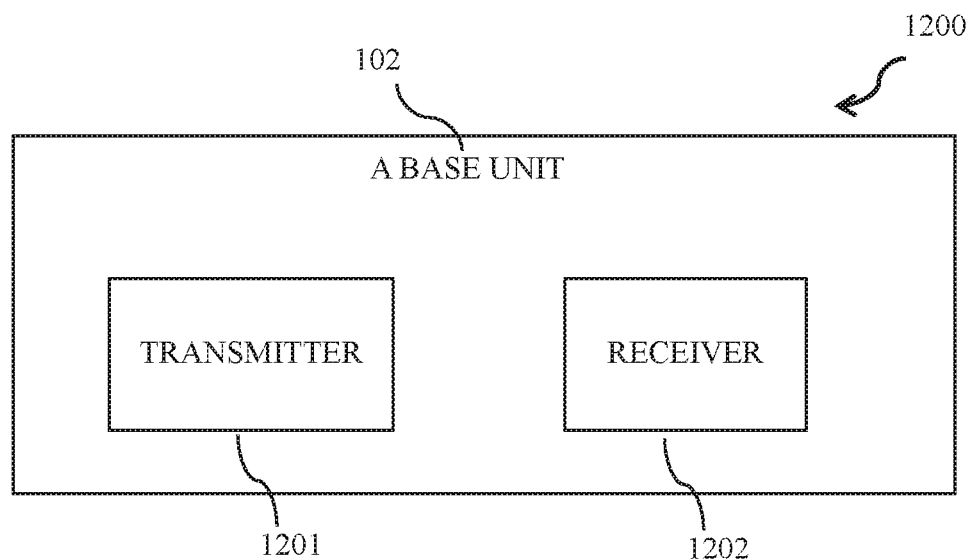
FIG. 12 illustrates an example block diagram of a base unit according to an embodiment of the present disclosure.

FIG. 12 illustrates an example block diagram of a base unit according to an embodiment of the present disclosure. The apparatus 1200 in FIG. 12 includes one embodiment of the base unit 102. Furthermore, the base unit 102 may include a transmitter 1201 and a receiver 1202. In an embodiment, the transmitter 1201 and the receiver 1202 may be integrated into a single device, such as a transceiver. In certain embodiments, the base unit 102 may further include an input device, a display, a memory, and/or other elements. In one embodiment, a transmitter 1201 transmits, to a remote unit, a first control signal on a carrier within a carrier group in a slot, wherein the first control signal includes an indicator for indicating whether the carrier is a last scheduled carrier of the carrier group for downlink transmissions. The receiver 1202 receives a HARQ-ACK codebook corresponding to the downlink transmissions in the slot for the carrier group, wherein, based on the first control signal, one or more HARQ-ACK bits for the last scheduled carrier are arranged at the end of the HARQ-ACK codebook.

The apparatus 1200 may further include a processor, which is used for grouping carriers into different carrier groups, determining a size of a HARQ-ACK codebook, or other processes performed in the apparatus 1200. The functions and implementations of all elements in the apparatus 1200 and definitions of related technical terms can refer to the specific descriptions of FIGS. 3-10 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this document, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

The following is what is claimed:

1. An apparatus comprising:
   a receiver that receives a plurality of downlink transmissions, wherein each downlink transmission has a first signal indicating whether the downlink transmission is a last transmission of the plurality of downlink transmissions; and
   a transmitter that transmits a hybrid automatic repeat request acknowledgement codebook corresponding to the plurality of downlink transmissions, wherein, based on the first signal, hybrid automatic repeat request acknowledgement feedback for the last transmission of the plurality of downlink transmissions is arranged at the end of the hybrid automatic repeat request acknowledgement codebook; and
   wherein the plurality of downlink transmissions are carried on a plurality of carrier groups, each of the plurality of carrier groups comprises at least one carrier, and the first signal indicates whether the downlink transmission is transmitted in a last slot of a plurality of slots for a carrier group on which the downlink transmission is carried.

2. The apparatus according to claim 1, wherein the plurality of downlink transmissions are received within the plurality of slots or a slot.

3. The apparatus according to claim 1, further comprising a processor that based on the first signal determines whether the last downlink transmission is received or not and arranges one or more negative acknowledgement bits for the last downlink transmission at the end of the hybrid automatic repeat request acknowledgement codebook in response to last downlink transmission being not received.

4. The apparatus according to claim 1, wherein the first signal further includes a total downlink assignment index and a counter downlink assignment index, the value of the total downlink assignment index denotes a total number of one or more carriers for downlink transmissions, and the value of the counter downlink assignment index denotes an accumulative number of carriers for downlink transmissions in a slot in a carrier group.

5. An apparatus comprising:
   a transmitter that transmits a plurality of downlink transmissions, wherein each downlink transmission has a first signal indicating whether the downlink transmission is a last transmission of the plurality of downlink transmissions; and
   a receiver that receives a hybrid automatic repeat request acknowledgement codebook corresponding to the plurality of downlink transmissions, wherein, based on the first signal, hybrid automatic repeat request acknowledgement feedback for the last transmission of the plurality of downlink transmissions is arranged at the end of the hybrid automatic repeat request acknowledgement codebook;
   wherein the plurality of downlink transmissions are carried on a plurality of carrier groups, each of the plurality of carrier groups comprises at least one carrier, and the first signal indicates whether the downlink transmission is transmitted in a last slot of a plurality of slots for a carrier group on which the downlink transmission is carried.

6. The apparatus according to claim 5, wherein the plurality of downlink transmissions are transmitted within the plurality of slots.

7. The apparatus according to claim 5, wherein the first signal further includes a total downlink assignment index and a counter downlink assignment index, the value of the total downlink assignment index denotes a total number of one or more carriers for downlink transmissions, and the value of the counter downlink assignment index denotes an accumulative number of carriers for downlink transmissions in a slot in a carrier group.

8. A method comprising:
   receiving a plurality of downlink (DL) transmissions, wherein each DL downlink transmission has a first signal indicating whether the DL downlink transmission is a last transmission of the plurality of DL downlink transmissions; and
   transmitting a hybrid automatic repeat request acknowledgement (HARQ-ACK) codebook corresponding to the plurality of DL downlink transmissions, wherein, based on the first signal, HARQ-ACK hybrid automatic repeat request acknowledgement feedback for the last transmission of the plurality of DL downlink transmissions is arranged at the end of the HARQ-ACK hybrid automatic repeat request acknowledgement codebook;
   wherein the plurality of DL transmissions are carried on a plurality of carrier groups, each of the plurality of carrier groups comprises at least one carrier, and the first signal indicates whether the downlink transmission is transmitted in a last slot of a plurality of slots for a carrier group on which the downlink transmission is carried.

* * * * *